US004001574B2

United States Statutory Invention Registration [19]

[11] Reg. Number: H1574

Motter et al.

[45] Published: Aug. 6, 1996

[54] EVACUATED FOAM INSULATION PANEL CONTAINING A GETTER MATERIAL

[75] Inventors: Gregg A Motter; James E. Kosinski, both of Midland, Mich.

[73] Assignee: The Dow Chemical Company, Midland, Mich.

[21] Appl. No.: 597,658

[22] Filed: Feb. 7, 1996

[51] Int. Cl.[6] ..... B32B 1/04; B32B 3/02

[52] U.S. Cl. ..... 428/69

*Primary Examiner*—Charles T. Jordan
*Assistant Examiner*—Meena Chelliah
*Attorney, Agent, or Firm*—J. Robert Dean, Jr.; Bruce M. Kanuch; Stephen S. Grace

[57] ABSTRACT

There is an evacuated insulation panel having a corestock of a polymer foam having an open cell content of 70 percent or more. There is a getter material in the interior of the panel to adsorb gases and vapors which may permeate into the panel over an extended period of time.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EVACUATED FOAM INSULATION PANEL CONTAINING A GETTER MATERIAL

BACKGROUND OF THE INVENTION

This invention relates to an evacuated foam insulation panel containing a getter material.

To significantly improve the performance of insulating systems, vacuum or evacuated panel technology is currently being evaluated by industry. The absence of air or gas in panels affords the possibility of substantial enhancement of insulating performance.

A useful evacuated insulation system is one employing a panel corestock of an open-cell foam. The open-cell structure of the foam allows rapid and substantially complete withdrawal of gases from within the foam structure and the panel. The rigid foam matrix provides a corestock of substantial mechanical strength and performance.

Though evacuated insulation panels are hermetically sealed, gases and vapors such as air and water vapor will seep or permeate into the evacuated interior of the panel over a long period of time. The presence of gases or vapors in the evacuated interior of the insulation panel denudes the insulation capability of the panel.

It would be desirable to have an evacuated insulation panel employing a corestock of open-cell foam wherein the insulation panel has the capability of absorbing seeping gases and vapors over an extended period of time, such as twenty or thirty years. It would be particularly desirable to such an evacuated insulation panel employing an open-cell foam of an alkenyl aromatic polymer.

SUMMARY OF THE INVENTION

According to the present invention, there is an evacuated insulation panel having a corestock of an open-cell polymer foam. There is a getter material in the evacuated interior of the panel to adsorb gases or vapors which may permeate into the panel over an extended period of time.

DETAILED DESCRIPTION

To enhance the long-term insulation performance of the evacuated panel, the evacuated interior of the panel is provided with a "getter" material. The getter material absorbs gases or vapors which seep or permeate into the vacuum panel over time. Conventional getter materials include metals and metal alloys of barium, aluminum, magnesium, calcium, iron, nickel, and vanadium. Teachings to suitable getter materials include but are not limited to those set forth in U.S. Pat. Nos. 5,191,980, 5,312,606, 5,312,607, and WO 93/25843, which are incorporated herein by reference.

Other types of useful getter materials include conventional dessicants, which are useful for adsorbing water vapor or moisture. Such materials are advantageously incorporated into the evacuated insulation panel in the form of a packet having a porous or permeable wrapper or receptacle containing the material therein. Useful materials include silica gel, activated alumina, aluminum-rich zeolites, calcium chloride, calcium oxide, and calcium sulfate. A preferred material is calcium oxide.

The evacuated insulation panels are useful in any conventional insulating applications such as roofing, buildings, refrigerators, etc.

The foam corestock is particularly useful as board stock in a hermetically-sealed evacuated panel. The panel may be formed as follows: a) the foam is placed inside a receptacle or enclosure such as a bag; b) the interior of the receptacle or enclosure and the foam are evacuated to a partial or near total vacuum (subatmospheric absolute pressure); and c) the receptacle or enclosure is sealed as to be air tight or hermetically sealed. The panel is preferably evacuated to about 10 torr or less, more preferably to about 1 torr or less, and most preferably to about 0.1 torr or less absolute pressure. The evacuated panel is useful in the insulating applications described above. Teachings to various evacuated panels are seen in U.S. Pat. Nos. 5,346,928; 4,726,974; 4,636,415; and 4,304,824, which are incorporated herein by reference.

A useful evacuated panel employs as an enclosure formed of a laminate sheet of three or more layers. The outer layer comprises a scratch resistant material such as a polyester. The middle layer comprises a barrier material such as aluminum, polyvinylidine chloride, and polyvinyl alcohol. The inner layer comprises a heat sealable material such as polyethylene or ethylene/acrylic acid copolymer.

The foam has an open cell content of 70 percent or more, preferably 90 percent or more, and more preferably 95 percent or more according to ASTM D2856-A. Most preferably, the open cell content is as close as possible to 100 percent.

The foam has the density of from about 16 to about 250 kilograms per cubic meter ($kg/cm^3$) and most preferably from about 25 to about 100 $kg/cm^3$ according to ASTM D-1622-88.

The foam may take any physical configuration known in the art such as sheet or plank. The foam corestock is particularly suited to be formed into a plank, desirably one having a cross-sectional area of 30 square centimeters (cm) or more and a minor dimension in cross-section (thickness) of about ⅜ inch (0.95 cm) or more. Alternately, multiple foam sheets can be stacked to form a thicker corestock. Using multiple sheets allows for more rapid evacuation of gases from the interior of the evacuated panel.

Various additives may be incorporated in the foam such as inorganic fillers, pigments, antioxidants, acid scavengers, ultraviolet absorbers, flame retardants, processing aids, extrusion aids, and the like.

The foam may contain an infrared attenuating agent (IAA) to further enhance its insulating performance. The IAA is composed of a different substance than the polymer substrate of the foam in which it is incorporated. The IAA may absorb or reflect infrared radiation or both. Useful IAA include particulate flakes of metals such as aluminum, silver, and gold and carbonaceous substances such as carbon black, activated carbon black and graphite. Useful carbon blacks include thermal black, furnace black, acetylene black, and channel black. Preferred IAA are thermal black and graphite. The IAA preferably comprises between about 1.0 and about 25 weight percent and preferably between about 3.0 and about 20 weight percent and most preferably about 4.0 to about 10 weight percent based upon the weight of the polymer material.

To further enhance the insulation performance in the evacuated panel, the foam may be compressed in the thickness direction prior to insertion. Insulation value per unit thickness is enhanced.

The foam may be selected from any of those which can be blown into a foam with an open-cell structure. Suitable polymers include polyolefins, polyvinylidene chloride, alkenyl aromatic polymers, polycarbonates, polyamides, polyesters, polyvinylchloride, polyetheramides, polymethylmethacrylate, polyurethanes, polyisocyanurates, phenolics, rubber-modified polymers, and the like. Suitable polyolefins include polyethylene and polypropylene. Suitable alkenyl aromatic polymers include polystyrene and copolymers of polystyrene and monomers, such as acrylic acid and butylacrylate. Suitable polyethylenes include those of high, medium, low, linear low, and ultra low density types.

A preferred foam comprises an alkenyl aromatic polymer material. The present foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams comprise substantially (i.e., greater than 95 percent) and most preferably entirely of polystyrene. Preferably, the alkenyl aromatic polymer foam is free of rubber content such as $C_{4-6}$ diene content and thermoset polymer content such as polyisocyanurate or polyurethane.

A most preferred foam comprises an extruded, open-cell microcellular alkenyl aromatic polymer material. The foam comprises an alkenyl aromatic polymer material comprising greater than 50 percent by weight alkenyl aromatic monomeric units. The foam has an open cell content of about 70 percent or more. The foam has an average cell size of 70 micrometers or less. Excellent teachings concerning the preparation of such microcellular foams are set forth in U.S. Ser. No. 08/430,783 filed Apr. 27, 1995.

The microcellular alkenyl aromatic polymer foam has an average cell size of about 70 micrometers or less, preferably about 1 to about 30 micrometers, and more preferably about 1 to about 20 micrometers, and most preferably from about 1 micrometer to about 10 micrometers according to ASTM D3576-77. The cell size or pore size (diameter) for the microcellular foams is determined according to ASTM D3576-77 except that measurement is taken from an enlarged photograph obtained by scanning electron microscopy instead of measurement taken directly from the foam.

Methods for making useful polyurethane and polyisocyanurate foams are taught in U.S. Pat. Nos. 3,580,869; 4,795,763; 5,288,766; 5,334,624; and 5,346,928, which are incorporated herein by reference.

Methods for making useful microporous thermoplastic foams by phase separation, microemulsions, or supercritical fluids are seen in U.S. Pat. Nos. 4,673,695; 4,473,665; 5,037,859; 5,158,986; and 5,334,356, which are incorporated herein by reference. Microcellular foams are inclusive of microporous foams.

What is claimed is:

1. An evacuated polymer foam insulation panel, the panel comprising a corestock of an extruded, microcellular, open-cell foam and a receptacle capable of enclosing the corestock and being hermetically-sealed, the corestock being situated within the receptacle, the interior of the receptacle and the corestock being evacuated to a subatmospheric pressure, the foam comprising an alkenyl aromatic polymer material comprising greater than 50 percent by weight alkenyl aromatic monomeric units, the foam having an open cell content of 70 percent or more, the foam having an average cell size of about 70 micrometers or less, the interior of the receptacle having a getter material.

2. The panel of Claim 1, wherein the interior of the receptacle and the corestock being evacuated to an absolute pressure of about 10 torr or less, the polymer foam having an open cell content of about 90 percent or more, the polymer foam having a density of from about 16 to about 250 kilograms per cubic meter.

3. The panel of claim 1, wherein the interior of the receptacle and the corestock being evacuated to an absolute pressure of about 1 torr or less, the polymer foam having an open cell content of about 95 percent or more, the polymer foam having a density of from about 25 to about 100 kilograms per cubic meter.

4. The panel of claim 3, wherein the foam has an average cell size of about 1 micrometer to about 30 micrometers.

5. The panel of claim 3, wherein the foam has an average cell size of about 1 micrometer to about 20 micrometers.

6. The panel of claim 3, wherein the foam has an average cell size of about 1 micrometer to about 10 micrometers.

7. The panel of claim 3, wherein the getter material comprises metals or alloys of metals selected from the group consisting of barium, aluminum, calcium, iron, nickel, and vanadium.

* * * * *